United States Patent
Kaplan et al.

(10) Patent No.: US 12,348,649 B1
(45) Date of Patent: Jul. 1, 2025

(54) AUTHENTICATION SIGNATURE EMBEDDING IN DIGITAL MEDIA

(71) Applicant: SAIVD, Inc., Sheridan, WY (US)

(72) Inventors: Ido Kaplan, Tel Aviv (IL); Elon Kaplan, Tel Aviv (IL)

(73) Assignee: SAIVD, Inc., Sheridan, WY (US)

( * ) Notice: Subject to any disclaimer, the term of this patent is extended or adjusted under 35 U.S.C. 154(b) by 0 days.

(21) Appl. No.: 19/074,401

(22) Filed: Mar. 9, 2025

(51) Int. Cl.
H04L 9/40 (2022.01)
H04L 9/32 (2006.01)

(52) U.S. Cl.
CPC .................. *H04L 9/3247* (2013.01)

(58) Field of Classification Search
CPC .................................................. H04L 9/3247
See application file for complete search history.

(56) References Cited

U.S. PATENT DOCUMENTS

| | | | |
|---|---|---|---|
| 7,620,253 B2 | 11/2009 | Miller et al. | |
| 7,986,845 B2 | 7/2011 | Miller et al. | |
| 9,098,724 B2 | 8/2015 | Keidar et al. | |
| 11,902,559 B2 | 2/2024 | Levy et al. | |
| 12,175,578 B1* | 12/2024 | Campbell | G06T 13/00 |
| 2006/0020597 A1* | 1/2006 | Keating | G06F 16/5838 |
| 2007/0266252 A1* | 11/2007 | Davis | G06F 21/10 |
| | | | 713/176 |
| 2014/0324833 A1* | 10/2014 | Davis | G06F 16/433 |
| | | | 707/722 |
| 2017/0085880 A1* | 3/2017 | Minoo | H04N 19/70 |
| 2021/0160975 A1* | 5/2021 | Cremer | H05B 47/105 |
| 2021/0266641 A1* | 8/2021 | Selfors | H04N 21/4856 |
| 2024/0013564 A1* | 1/2024 | Kim | G06V 10/454 |
| 2024/0114184 A1* | 4/2024 | Kipp | H04N 21/2353 |
| 2025/0022457 A1* | 1/2025 | Wu | G10L 15/16 |

FOREIGN PATENT DOCUMENTS

WO 2003/054798 A2 7/2003

OTHER PUBLICATIONS

Jayakanth Kunhoth et al., "Video steganography: recent advances and challenges," Multimedia Tools and Applications (2023) 82:41943-41985.
Shanti Rao, "Video Authentication Steganography," available online at http://www.shantirao.com/vsteg.html (with no date), earliest version archived online appears to be https://web.archive.org/web/20030714030426/www.shantirao.com/vsteg.html (dated Jul. 14, 2002).

* cited by examiner

*Primary Examiner* — Ghodrat Jamshidi
(74) *Attorney, Agent, or Firm* — The Roy Gross Law Firm, LLC; Roy D. Gross

(57) ABSTRACT

A computer-implemented method comprising receiving a digital media signal from a creator; segmenting the media signal into sequential discrete segments; selecting a subset of the sequential discrete segments; iteratively, for each discrete segment, (i) generating a segment vector, (ii) generating an encrypted metadata vector based on media signal metadata, (iii) combining the segment vector and the metadata vector, (iv) applying a modulo operation to the combined vector to obtain a hidden pattern vector, (v) generating an encrypted creator vector, (vi) subtracting the hidden pattern vector from the creator vector to obtain a signature vector, (vii) modifying selected values in the discrete segment, based on the signature vector, to obtain a modified discrete segment; and outputting a modified version of the media signal comprising all of the modified discrete segments.

14 Claims, 8 Drawing Sheets

400

|     | 0   | 1   | 2   | 3   | 4   | ... | 47  | 48  | 49  | 50  |
|-----|-----|-----|-----|-----|-----|-----|-----|-----|-----|-----|
| 0   | 1   | 0   | 20  | 25  | 22  | 24  | 125 | 131 | 144 | 87  |
| 1   | 111 | 0   | 55  | 222 | 225 | 54  | 53  | 52  | 11  | 111 |
| 2   | 85  | 225 | 222 | 125 | 37  | 38  | 120 | 145 | 0   | 0   |
| 3   | 111 | 0   | 55  | 222 | 225 | 54  | 53  | 52  | 11  | 111 |
| 4   | 1   | 0   | 20  | 25  | 22  | 24  | 125 | 131 | 144 | 87  |
| ... | 111 | 0   | 55  | 222 | 225 | 54  | 53  | 52  | 11  | 111 |
| 477 | 85  | 225 | 222 | 125 | 37  | 38  | 120 | 145 | 0   | 0   |
| 478 | 1   | 0   | 20  | 25  | 22  | 24  | 125 | 131 | 144 | 87  |
| 479 | 85  | 225 | 222 | 125 | 37  | 38  | 120 | 145 | 0   | 0   |
| 480 | 111 | 0   | 55  | 222 | 225 | 54  | 53  | 52  | 11  | 111 |

302

| 125 | 0 | 12 | 254 | 122 | 111 | 100 | 95 | 54 | 89 |
|-----|---|----|-----|-----|-----|-----|----|----|----|

FIG.4C

AUTHENTICATION SIGNATURE EMBEDDING IN DIGITAL MEDIA

BACKGROUND

The invention relates to the field of digital media authentication and security.

Steganography is the practice of modifying data to conceal additional information in a manner which is imperceptible, or virtually so, to an ordinary user, but is detectable using a dedicated detection protocol. Steganography and related information hiding techniques can be used to authenticate data, verify data integrity, deter malicious attacks, and provide data security, privacy, and confidentiality. Steganography may be used to include information in any media signal-of-interest, most commonly in images, audio signals, and video signals. However, steganography may also be applied to other types of media objects.

One potential application of steganography is adding an authentication signature to digital media files. Concealed authentication signature can be used for media authentication purposes, to verify the source and integrity of media signals. Because digital media can readily be reproduced and manipulated, it is important for content creators, media distributors and platforms, and even end-users, to be able to confirm that a media signal originated from its purported source, and that it has not been altered or manipulated in any way by an unauthorized third-party. Concealed authentication signature can thus help to prevent unauthorized reproduction and counterfeiting, and to control the use, transmission or rendering of the media signal.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a computer-implemented method comprising: receiving, from a creator, a digital media signal and associated metadata comprising at least a media signal name, wherein the media signal is associated with a unique creator identifier; segmenting the media signal into sequential discrete segments, each represented as a rectangular tensor comprising columns and rows of values and having a width W and a height H, wherein each of the discrete segments is assigned a segment identification number; selecting a subset of the sequential discrete segments; iteratively, for each respective one of the discrete segments in the subset: (i) generating a segment vector, wherein each term in the segment vector represents a sum of the values in a corresponding one of the columns in the respective discrete segment, (ii) generating a metadata vector based on the associated metadata and the segment identification number of the respective discrete segment, wherein the metadata vector is encrypted using a first encryption key, (iii) combining the segment vector and a portion of the metadata vector having a length equal to W, to generate an updated segment vector, (iv) applying a modulo operation, based on a numerical value equal to H, to each term in the updated segment vector, to obtain a hidden pattern vector, (v) generating a creator vector based on the unique creator identifier, wherein the creator vector is encrypted using a second encryption key associated with the creator, (vi) subtracting the hidden pattern vector from the creator vector to obtain a signature vector, (vii) modifying a selected subset of the values in each of the columns in the respective discrete segment, based on a corresponding term in the signature vector, to obtain a modified the respective discrete segment, and (viii) repeating steps (i)-(vii) with respect to a next respective one of the discrete segments in the subset the discrete; and outputting a modified version of the media signal comprising all of the modified discrete segment.

There is also provided, in an embodiment, a computer program product comprising a non-transitory computer-readable storage medium having program instructions embodied therewith, the program instructions executable by a computer system to: receive, from a creator, a digital media signal and associated metadata comprising at least a media signal name, wherein the media signal is associated with a unique creator identifier; segment the media signal into sequential discrete segments, each represented as a rectangular tensor comprising columns and rows of values and having a width W and a height H, wherein each of the discrete segments is assigned a segment identification number; select a subset of the sequential discrete segments; iteratively, for each respective one of the discrete segments in the subset: (i) generate a segment vector, wherein each term in the segment vector represents a sum of the values in a corresponding one of the columns in the respective discrete segment, (ii) generate a metadata vector based on the associated metadata and the segment identification number of the respective discrete segment, wherein the metadata vector is encrypted using a first encryption key, (iii) combine the segment vector and a portion of the metadata vector having a length equal to W, to generate an updated segment vector, (iv) apply a modulo operation, based on a numerical value equal to H, to each term in the updated segment vector, to obtain a hidden pattern vector, (v) generate a creator vector based on the unique creator identifier, wherein the creator vector is encrypted using a second encryption key associated with the creator, (vi) subtract the hidden pattern vector from the creator vector to obtain a signature vector, (vii) modify a selected subset of the values in each of the columns in the respective discrete segment, based on a corresponding term in the signature vector, to obtain a modified the respective discrete segment, and (viii) repeat steps (i)-(vii) with respect to a next respective one of the discrete segments in the subset the discrete; and output a modified version of the media signal comprising all of the modified discrete segment.

There is also provided, in an embodiment, a system comprising at least one processor; and a non-transitory computer-readable storage medium having stored thereon program instructions, the program instructions executable by the at least one processor to: receive, from a creator, a digital media signal and associated metadata comprising at least a media signal name, wherein the media signal is associated with a unique creator identifier, segment the media signal into sequential discrete segments, each represented as a rectangular tensor comprising columns and rows of values and having a width W and a height H, wherein each of the discrete segments is assigned a segment identification number, select a subset of the sequential discrete segments, iteratively, for each respective one of the discrete segments in the subset: (i) generate a segment vector, wherein each term in the segment vector represents a sum of the values in a corresponding one of the columns in the respective discrete segment, (ii) generate a metadata vector based on the associated metadata and the segment identification number of the respective discrete segment, wherein the metadata vector is encrypted using a first encryption key, (iii) combine the segment vector and a portion of the metadata vector having a length equal to W, to generate an updated segment vector, (iv) apply a modulo operation, based on a numerical value equal to H, to each term in the updated segment vector, to obtain a hidden pattern vector, (v) generate a creator vector based on the unique creator identifier, wherein the creator vector is encrypted using a second encryption key associated with the creator, (vi) subtract the hidden pattern vector from the creator vector to obtain a signature vector, (vii) modify a selected subset of the values in each of the columns in the respective discrete segment, based on a corresponding term in the signature vector, to obtain a modified the respective discrete segment, and (viii) repeat steps (i)-(vii) with respect to a next respective one of the discrete segments in the subset the discrete, and output a modified version of the media signal comprising all of the modified discrete segment.

In some embodiments, the media signal is a digital video signal, wherein each of the discrete segments comprises one frame of the digital video signal.

In some embodiments, the digital video signal is associated with a color space having a specified number of color channels, wherein each of the discrete segments comprises the one frame in only one of the color channels.

In some embodiments, the media signal is a digital audio signal comprising analog sound wave samples which are samples at a known sampling rate, wherein each of the discrete segments comprises a time-window of the media signal having a predetermined length, and wherein the time-window is represented as the rectangular tensor having the width W equal to a number of 10 ms intervals in the time-window, and the height H equal to a number of the samples in the 10 ms interval, calculated based on the known sampling rate.

In some embodiments, the metadata further comprises a date associated with the receiving, wherein the metadata vector is further based on the date.

In some embodiments, the selecting of the subset is based on one of the following methods: selecting all of the discrete segments, selecting one of every specified number of the discrete segments, selecting one or more of the discrete segments every specified period of time, or selecting a specified number of sequential the discrete segments.

In some embodiments, a number of the values in the selected subset of the values is equal to the absolute value of the corresponding term in the signature vector, wherein the subset of values is selected based on one of the following methods: random selection, selecting one of every specified number of the values, selecting the values exceeding a predetermined value threshold, or selecting the values representing the least significant the values in the respective discrete segment.

In some embodiments, the modifying of the selected subset of the values comprises increasing each of the values in the subset of values by 1 when the corresponding term in the signature vector is positive, decreasing each of the values in the subset of values by 1 when the corresponding term in the signature vector is negative, and not modifying the selected subset of the values when the corresponding term in the signature vector is equal to zero.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 4B shows schematically an exemplary digital audio time-window, comprising 24,000 sound wave samples, and arranged as a tensor of dimensions W50×H480 terms, arranged in columns and rows.

FIG. 4C show a numerical example of the various steps in a method which provides a protocol for embedding an imperceptible authentication signature in digital media signals.

DETAILED DESCRIPTION

Figure 1A:
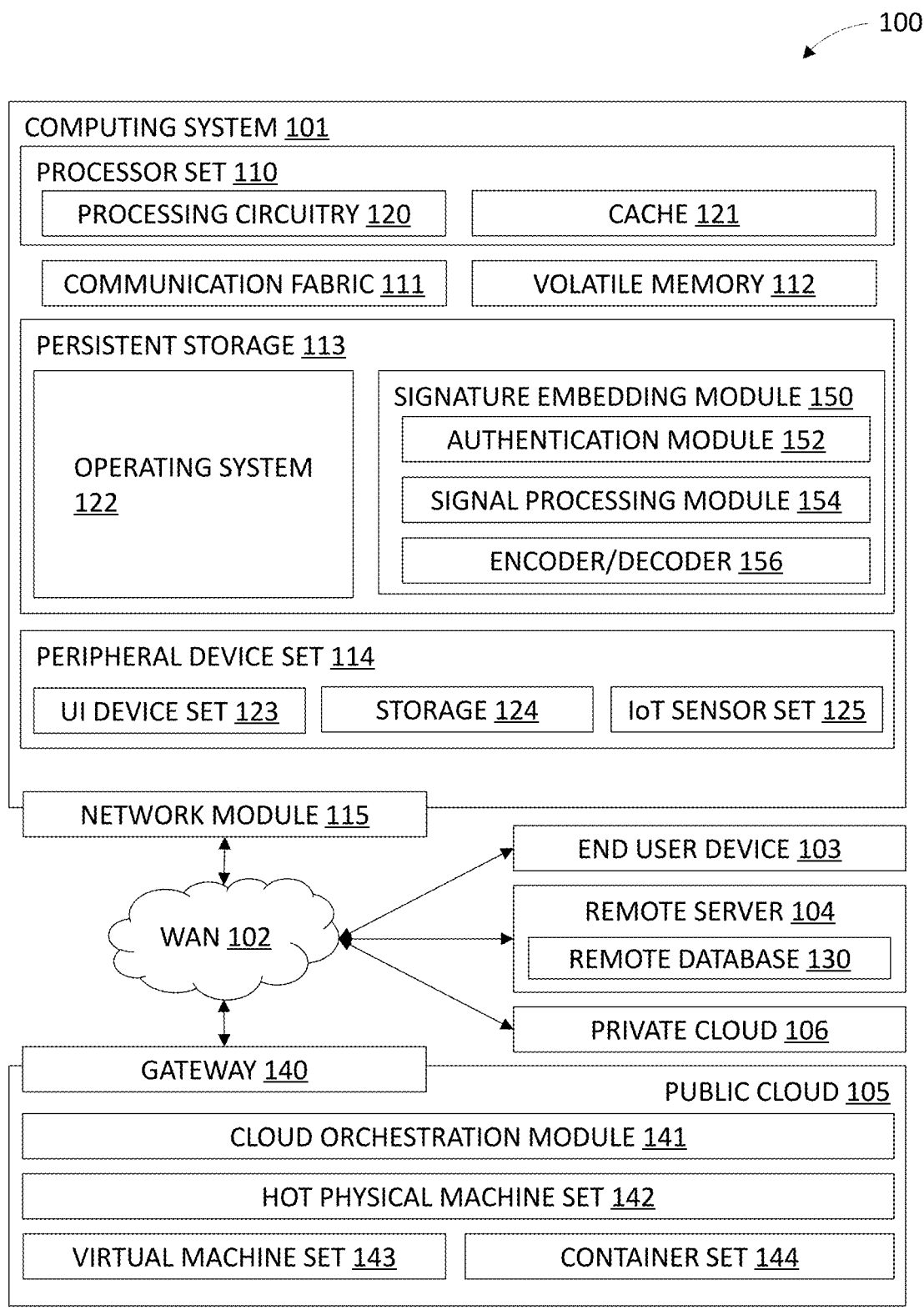
FIG. 1A shows a block diagram of an exemplary computing environment, comprising a computing system configured to execute at least some of the computer code involved in performing the inventive methods.

Disclosed herein is a technique, embodied as a computer-implemented method, a system, and a computer program product, which provides a protocol for embedding an imperceptible authentication signature in digital media signals, and for real-time authentication and verification of the media during playback. In some embodiments, the present technique can be used to verify that a media signal originated from its purported source, and that it has not been altered or manipulated in any way by an unauthorized third-party.

In some embodiments, the present technique provides for embedding an authentication signature in a media signal by modifying signal data, in a way which is imperceptible or virtually imperceptible to human senses (e.g., visually or audibly). However, the authentication signature is configured to be detectable using a dedicated decoding protocol.

In some embodiments, the present technique provides for embedding an authentication signature in a media signal, wherein the authentication signature represents unique media creator identifiers and media metadata. In some embodiments, the embedded authentication signature, representing unique media creator identifiers and media metadata, is encrypted using one or more layers of encryption, e.g., at least two layers of encryption.

As used throughout this disclosure, the terms "media," "media signal," or "digital media" may be used broadly and interchangeably to refer to any single image, or any continuous stream of audio, video, or a combination of audio and video data.

The present technique provides for secure encoding and decoding of media signals, which enables detection of video tampering, e.g., during transmission of the media signal from a transmitting party (such as a content creator) to a receiving party (such as a content distributor).

In some embodiments, the present technique embeds an encrypted authentication signature in selected discrete segments of the media signal. For example, in the case of video media, the encrypted authentication signature may be embedded in selected or all frames of the video signal. The embedded signature can then be decoded and used to authenticate each discrete segment in which it was embedded, to verify the integrity of the media signal in whole or a selected part. Thus, the present technique provides confidence, to both the transmitting party and the receiving party, that the information received is an accurate representation of the information transmitted, and was not tampered with by a third party.

Embodiments of the present technique may be implemented to address the needs of media creators, broadcasters, streaming platforms, and end-users, to authenticate media signals. For example, the present technique enables media creators to embed unique identifiers within their media, to protect their intellectual property rights and to prevent unauthorized use and distribution of their work. In one example, the present technique can be used to identify sources of unauthorized distribution and unofficial leaks.

The present technique can further be used to embed metadata regarding the media signal, such as timestamps and other related information and identifiers, which allow downstream users to verify the source and integrity of the media. This is turn provides confidence to broadcasters and media distributors regarding the authenticity of the media they broadcast.

In some embodiments, the present technique can further be used to monitor and determine usage metrics regarding created media, such as access activity, downloads, viewing, and the like. This allows media owners to track usage and gain valuable information regarding their media, which can inform their content creation and distribution strategy.

Reference is now made to FIG. 1A, which shows a block diagram of an exemplary computing environment 100, comprising a computing system 101 configured to execute at least some of the computer code involved in performing the inventive methods.

Computing environment 100 includes, for example, a computing system 101, a wide area network (WAN) 102, an end user device (EUD) 103, a remote server 104, a public cloud 105, and/or a private cloud 106. In this example, computing system 101 includes a processor set 110 (including processing circuitry 120 and a cache 121), a communication fabric 111, a volatile memory 112, a persistent storage 113 (including an operating system 122 and a signature embedding module block 150), a peripheral device set 114 (including a user interface (UI), a device set 123, a storage 124, and an Internet of Things (IoT) sensor set 125), and a network module 115. Remote server 104 includes a remote database 130. Public cloud 105 includes a gateway 140, a cloud orchestration module 141, a host physical machine set 142, a virtual machine set 143, and a container set 144.

Computing system 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network and/or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computing system 101, to keep the presentation as simple as possible. computing system 101 may be located in a cloud, even though it is not shown in a cloud in FIG. 1. On the other hand, computing system 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computing system 101 to cause a series of operational steps to be performed by processor set 110 of computing system 101 and thereby effect a computer-implemented method, such that the instructions thus executed will instantiate the method(s) specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computing system 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computing system 101, volatile memory 112 is located in a single package and is internal to computing system 101, but, alternatively or additionally, the volatile memory may be distributed over multiple packages and/or located externally with respect to computing system 101.

Persistent storage 113 is any form of non-volatile storage for computers that is now known or to be developed in the future. The non-volatility of this storage means that the stored data is maintained regardless of whether power is being supplied to computing system 101 and/or directly to persistent storage 113. Persistent storage 113 may be a read-only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open source Portable Operating System Interface type operating systems that employ a kernel.

The code included in block 150 typically includes at least some of the computer code involved in performing the inventive methods, including an authentication module 152, a signal processing module 154, and/or an encoder/decoder 156.

Peripheral device set 114 includes the set of peripheral devices of computing system 101. Data communication connections between the peripheral devices and the other components of computing system 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computing system 101 is required to have a large amount of storage (for example, where computing system 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computing system 101 to communicate with other computers through WAN 102. Network module 115 may include hardware, such as a network interrace controller (NIC), a modem, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computing system 101 from an external computer or external storage device through the hardware included in network module 115.

WAN 102 is any wide area network (for example, the Internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computing system 101), and may take any of the forms discussed above in connection with computing system 101. EUD 103 typically receives helpful and useful data from the operations of computing system 101. For example, in a hypothetical case where computing system 101 is designed to provide a recommendation to an end user, this recommendation would typically be communicated from network module 115 of computing system 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computing system 101. Remote server 104 may be controlled and used by the same entity that operates computing system 101. Remote server 104 represents the machine(s) that collect and store helpful and useful data for use by other computers, such as computing system 101. For example, in a hypothetical case where computing system 101 is designed and programmed to provide a recommendation based on historical data, then this historical data may be provided to computing system 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the media signal the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 1B:
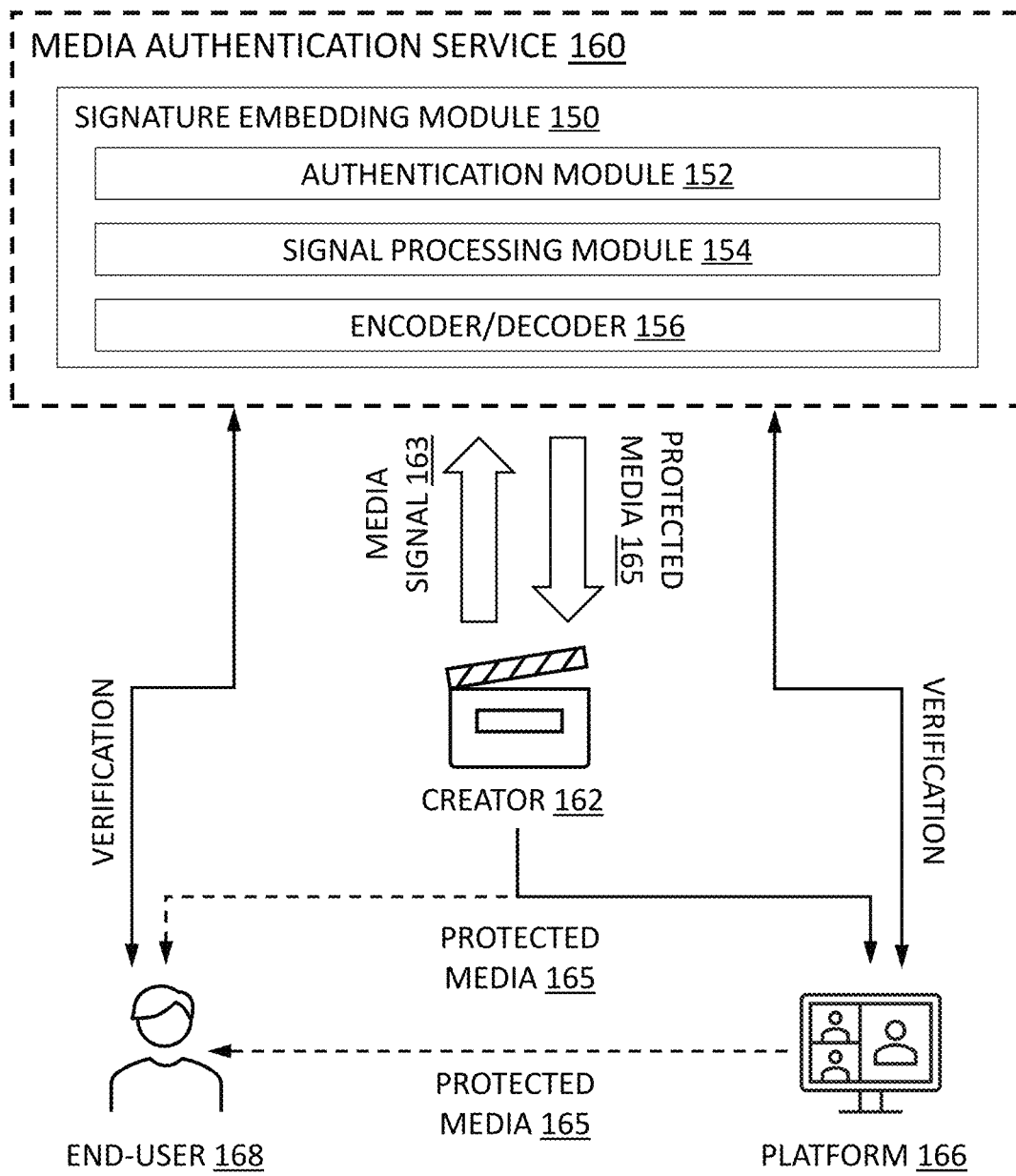
FIG. 1B shows an exemplary realization of a computing system configured to execute at least some of the computer code involved in performing the inventive methods.

FIG. 1B shows an exemplary realization of the present technique. In this example, signature embedding module 150 may be realized as a cloud-based or similar media authentication service 160, e.g., implemented on public cloud 105 of computing environment 100. Media authentication service 160 comprises signature embedding module 150, which comprises, e.g., authentication module 152, signal processing module 154, and encoder/decoder 156.

Media authentication service 160 is configured for processing media signals uploaded from media creators or other users, by embedding an imperceptible authentication signature therein. Media authentication service 160 is also configured for decoding the embedded authentication signature to verify the authenticity of the transmitted media signal to one or more prospective receivers. This decoding and verification process may be performed by media authentication service 160 in real-time or near real-time, e.g., right ahead of, or during, playback by the receiving third-party.

In one example, media authentication service 160 may be used by media content creators, such as creator 162, wishing to protect and verify the authenticity and integrity of content comprising media signal 163 (such as videos), before transmitting the media signal 163 to one or more receiving third-parties. In this scenario, a receiving third-party may be a commercial or similar media platform 166, such a content distributor, a broadcaster, or a media streaming platform. Media platform 166 may act as an intermediary between creator 162 and one or more end-users 168 (e.g., platform subscribers or members of the general public). However, the content may be distributed directly from creator 162 to one or more end-users 168, without the use of platform 166.

Creator 162 first registers as a user with media authentication service 160, using any suitable user registration and authentication procedure, such as multifactor authentication (MFA). Upon registration, creator 162 is granted access to media authentication service 160, and is provided with a unique creator identifier (which may be numerical, alphabetical, or alphanumerical) and a user encryption key. Creator 162 may then upload, as a registered user of media authentication service 160, a digital file comprising media signal 163 to media authentication service 160. The uploaded media signal 163 may comprise any single image or any continuous stream of audio, video, or a combination of audio and video data.

Media authentication service 160 then processes media signal 163 to embed an imperceptible authentication signature therein, which is based on one or more properties of creator 162 and the uploaded media signal, including, but not limited to:

Unique creator 162 identifier.
Creator 162 encryption key.
Media authentication service 160 encryption key.
Media signal 163 metadata 163*m*, which may comprise, but is not limited to:
  Media signal 163 name.
  Media signal 163 upload date.

Cloud 160 then provides back to creator 162 a protected version 165 of media signal 163, which comprises an embedded imperceptible authentication signature. Protected media 165 is suitable for distribution to third-parties. Protected media 165 has embedded therein an authentication signature which modifies the signal data of media signal 163, in a way which is imperceptible or virtually imperceptible to human senses (e.g., visually or audibly). However, the authentication signature is configured to be detectable using a dedicated decoding protocol. Using the embedded authentication signature, protected media 165 may be verified to confirm that protected media 165 originated from its purported sources (i.e., creator 162 and media signal 163), and that it has not been altered or manipulated in any way by an unauthorized third-party during transmission or distribution.

The receiving third-party (e.g., platform 166 or end-user 168) receives the protected media 165 with an embedded imperceptible authentication signature, directly from creator 160. Alternatively, in some cases, the receiving third-party (e.g., platform 166 or end-user 168) may receive protected media 165 directly from media authentication service 160. The receiving third-party may wish to verify the authenticity and integrity of the received protected media 165. Thus, the receiving third-party may then access media authentication service 160 to decode the embedded signature in protected media 165, and to verify the authenticity of protected media 165. This decoding and verification process may be performed by media authentication service 160 upon request from platform 166 or end-used 168, at any point or in real-time or near real-time, e.g., right ahead of, or during, playback by the receiving third-party of protected media 165.

In one scenario, the receiving third-party is platform 166 (e.g., YouTube, Netflix, and the like), which publishes protected media 165 for access by platform end-users 168 (e.g., platform 166 subscribers). For example, when media signal 163 is a video, an access link to the protected media 165 version may be published by platform 166, to enable end-users 168 to access and playback this content. In such case, platform 166 itself may wish to verify the authenticity of protected media 165 upon uploading. Thus, platform 166 may access media authentication service 160 to decode the embedded signature, and to receive verification from authentication service 160 regarding the authenticity of protected media 165. This decoding and verification process may be carried out offline by platform 166.

In another scenario, end-user 168 (e.g., a subscribers of platform 166), upon initiating playback of uploaded content, may wish to verify the authenticity of protected media 165. In this case, end-user 168 may access a link provided by platform 166 (e.g., as QR code or a hyperlink), which will access media authentication service 160, to decode the embedded signature and to receive verification regarding the authenticity of the protected media 165 to end-user 168. This decoding and verification process may be performed by media authentication service 160 in real-time or near real-time, e.g., right ahead of, or during, playback by end-user 168.

In some cases, platform 166, acting as intermediary, such as a content distributor, a broadcaster, or a media streaming platform, may have integrated therein one or more capabilities of signature embedding module 150. Thus, for example, platform 166 may be able to apply a predetermined protocol to decode the embedded signature and to verify the authenticity of protected media 165 internally or to end-user 168.

In yet another scenario, creator 162 may wish to provide media signal 163, such as a video, directly to one or more end-users 168, without using a commercial platform as an intermediary. In this example, media authentication service 160 may be used by creator 162 to protect and verify the authenticity and integrity of media signal 163, by generating protected version 165 of media signal 163, before transmitting to end-users 168. End-users 168, upon initiating playback, may wish to verify the authenticity of protected media 165. In this case, end-users 168 may follow a link which will access media authentication service 160, to decode the embedded signature and to verify the authenticity of the protected media 165 to end-user 168. This decoding and verification process may be performed by media authentication service 160 in real-time or near real-time, e.g., right ahead of, or during, playback by end-user 168.

In some embodiments, media authentication service 160 may be realized as an online-based service for content creators, to upload media content and to protect the authenticity and integrity of the content, before publishing or transmitting the content to a third-parties. For example, media authentication service 160 may offer optional mobile upload features, as well as desktop interface. Media authentication service 160 may rely on multifactor authentication (MFA) for registration and system access by users.

In some embodiments, the present technique may also be realized as a system development kit (SDK) to enable developers to integrate some or all of the capabilities of media authentication service 160, e.g., for enterprises such as broadcasting and streaming platforms. Such SDK may include, for example, developer tools, necessary documentation and libraries, integration tools, such as a sandbox environment for system capabilities, security features, and validation tools.

Figure 2A:
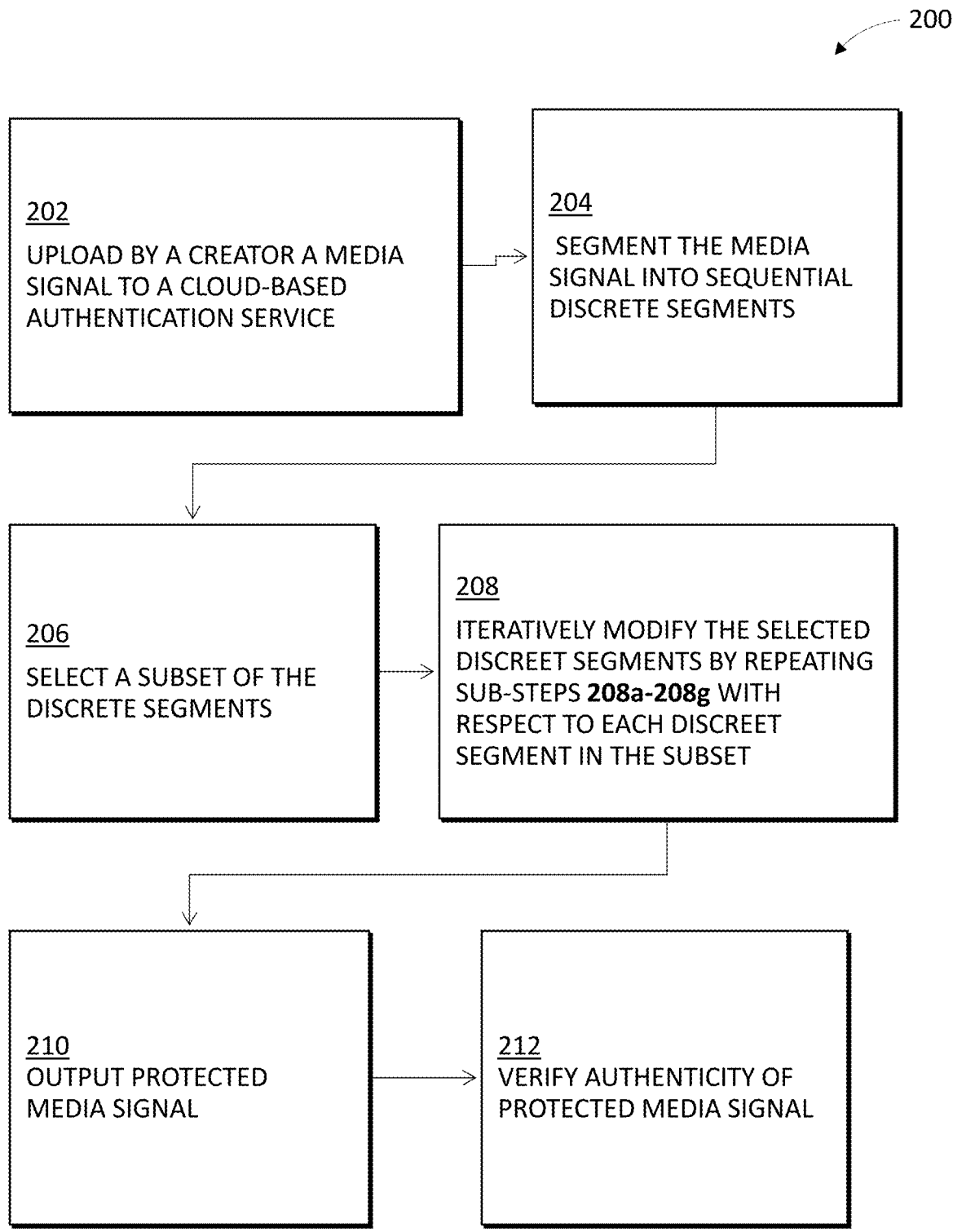
FIGS. 2A-2B illustrates a method which provides a protocol for embedding an imperceptible authentication signature in digital media signals.

The instructions of signature embedding module 150 are now discussed with reference to the flowchart of FIGS. 2A-2B, which illustrates a method 200 which provides a protocol for embedding an imperceptible authentication signature in digital media signals. The steps of method 200 are described with continued reference to FIGS. 1A and 1B, as well as to FIG. 3, which is a block diagram which illustrates the various steps in method 200.

Steps of method 200 may either be performed in the order they are presented or in a different order (or even in parallel), as long as the order allows for a necessary input to a certain step to be obtained from an output of an earlier step. In addition, the steps of method 200 are performed automatically (e.g., by computing system 101 of FIG. 1, or by any other applicable component of computing environment 100), unless specifically stated otherwise.

Method 200 begins in step 202, wherein creator 162 initiates a transmission of a media signal 163 to a receiving party, such as platform 166 or end-user 168.

In some embodiments, media signal 163 may be any single image, or any continuous stream of audio, video, or a combination of audio and video data.

In one example, creator 162 may wish to upload and publish media signal 163 to platform 166, which may be a content distributor, a broadcaster, or a media streaming platform. Platform 166 may thus act as an intermediary between the creator 162 and end-users 168 (which may be platform subscribers or members of the general public). In another example, creator 162 may wish to provide a media signal directly to one or more end-users 168, without the use of an intermediary such as platform 166.

In some embodiments, the present technique may be realized as a cloud-based or similar media authentication service 160, comprising signature embedding module 150, which comprises, e.g., authentication module 152, signal processing module 154, and encoder/decoder 156, as described with reference to FIG. 1B. In such cases, creator 162 may first register as a user with media authentication service 160.

Accordingly, in some embodiments, signature embedding module 150 may execute authentication module 152 to register and authenticate creator 162. In some embodiments, signature embedding module 150 may execute authentication module 152 to register and authenticate creator 162 using any suitable secure user registration and authentication procedure, such as multifactor authentication (MFA).

Upon registration, creator 162 is granted access to media authentication service 160, and is provided with a unique creator identifier (which may be numerical, alphabetical, or alphanumerical) and a user encryption key.

Creator 162 may then upload, as a user of media authentication service 160, a digital file comprising media signal 163 to media authentication service 160. The uploaded media signal 163 may comprise any single image data or any continuous stream of audio, video, or a combination of audio and video data. In one example, media signal 163 may comprise any image or video and/or audio in any suitable digital video or multimedia format, including, but not limited to, JPEG, MP4, MOV, MKV, and/or AVI. In another example, media signal 163 may comprise audio signal in any suitable digital audio format.

In step 204, signature embedding module 150 may execute signal processing module 154 to segment media signal 163 into discrete sequential segments 163s. In some embodiments, each discrete sequential segment 163s is assigned a segment identification number, e.g., a numerical identification number.

Figure 4A:
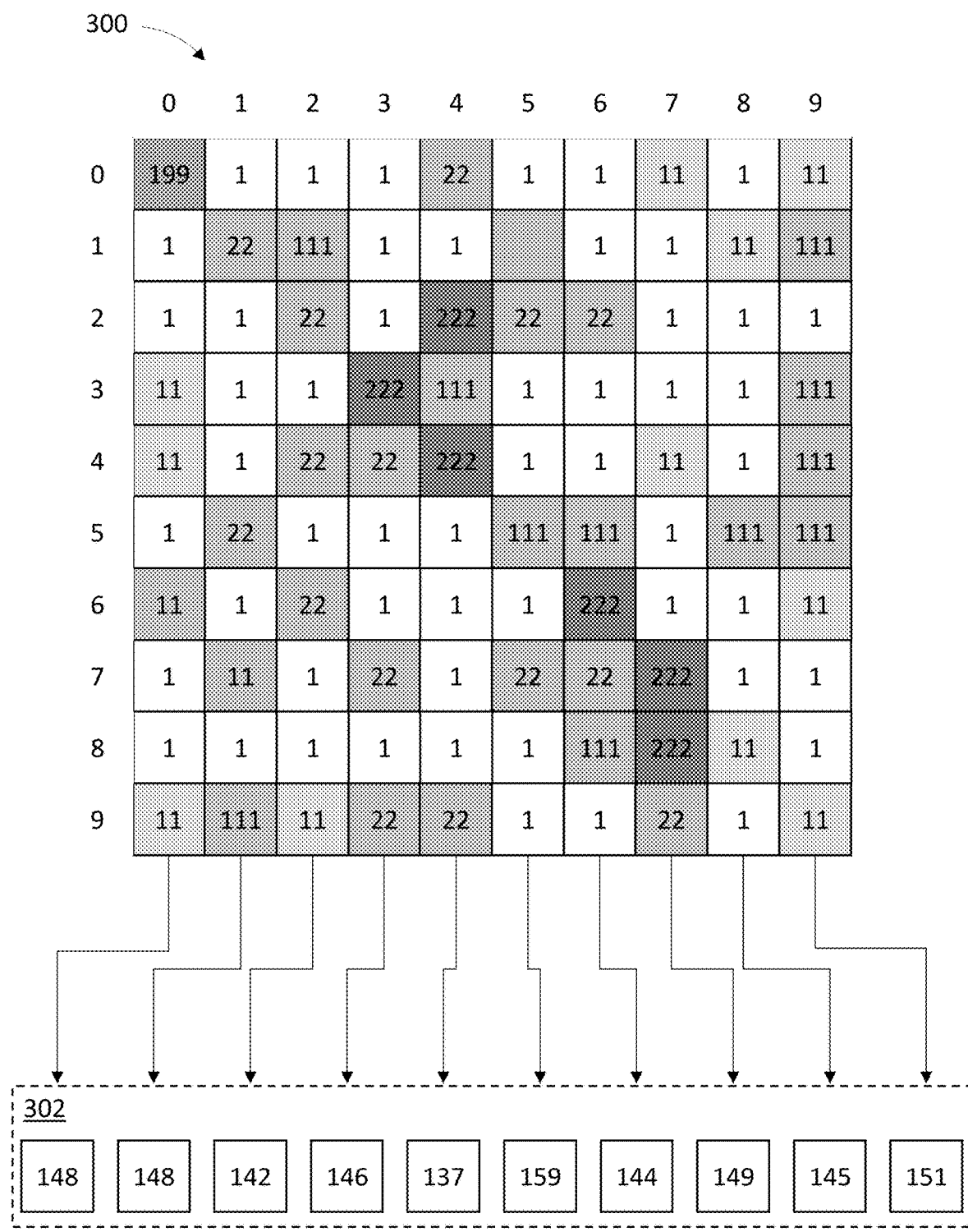
FIG. 4A shows schematically an exemplary video frame comprising W10×H10 pixels, arranged in columns and rows.

For example, in the case of a single image or video signal (or multimedia signal comprising video), signature embedding module 150 may execute signal processing module 154 to segment media signal 163 into sequential discrete segments 163s, which may be a single image or sequential video frames. In this case, an image or a video frame may be defined as a rectangular raster of pixels in a given color space, such as RGB, CMYK, and the like. FIG. 4A shows schematically an exemplary frame 300 having width W and height H of W10×H10 pixels, arranged in columns and rows. A single pixel is represented as a string of binary bits, which indicate pixel color and intensity. For example, an RGB pixel typically comprises 24 bits, or 8 bits representing the intensities of each of the red, green, and blue components of the pixel. However, various digital image and video formats may use different color spaces (e.g., comprising 3, 4, or more color channels), different resolutions or pixels-per-frame values (e.g., 640×1280, 1920×1080), and different numbers of bits to represent each pixel (e.g., between 2 and 48 bits).

In some cases, in the case of single image or video signals (or multimedia signals comprising video), signature embedding module 150 may execute signal processing module 154 to segment media signal 163 into sequential discrete segments 163s, each of which may represent a single color channel. For example, in the case of RGB format, signature embedding module 150 may execute signal processing module 154 to segment media signal 163 such that each discrete segment 163s represents only a single color channel of a frame (i.e., the red, green, or blue channel).

In the case of a digital audio signal, signature embedding module 150 may execute signal processing module 154 to segment media signal 163 into discrete segments 163s, which may be sequential time windows. In some embodiments, signature embedding module 150 may execute signal processing module 154 to segment media signal 163 into discrete segments 163s, wherein the discrete segments 163s may be sequential time windows, each having a length of between 10-1,000 ms. In one example, each sequential time window has a length of 500 ms.

Digital audio is represented as numerical samples of an analog sound wave in a continuous sequence. The samples are taken based on a predetermined sampling rate, such as 44.1 kHz samples per second. However, different digital audio formats may use various sampling rates, e.g., 48, 96 or 192 kHz). Each sample is a string comprising a predetermined number of binary bits (e.g., between 4 and 64 bits), which indicates the resolution in which an analog sound wave is sampled.

Accordingly, with reference to FIG. 4B, in the case of a media signal 163 comprising digital audio, the subset of discrete segments comprises a plurality of time windows 163s, wherein each time window may be represented as a tensor, such as exemplary tensor 400. As an example, with respect to digital audio having a sampling rate of 48 kHz, a particular time window 163i having a length of 500 ms will include 24,000 samples, each comprising a predetermined number of binary bits (e.g., between 4 and 64 bits), depending on the resolution in which an analog sound wave was sampled.

In one example, discrete segment 163i may be represented as a rectangular tensor having a width W equal to a number of 10 ms intervals in the time-window (for example, 50 such intervals in a time-window of 500 ms), and a height H which is calculated based on the sampling rate of the audio signal (for example, each 10 ms interval at a sampling rate of 48 kHz includes 480 samplings).

Accordingly, exemplary tensor 400 may comprise 24,000 terms arranged into dimensions W50×H480. However, alternative tensor dimensions may be used to represent the total number of sound wave samples in each time window.

In step 206, signature embedding module 150 may execute signal processing module 154 to select a subset of the discrete sequential segments 163s of media signal 163, as segmented in step 204.

In one example, signature embedding module 150 may execute signal processing module 154 to select a subset of the discrete sequential segments of media signal 163 comprising all of the discrete sequential segments 163s of media signal 163.

In another example, signature embedding module 150 may execute signal processing module 154 to select a subset of the discrete sequential segments 163s of media signal 163, based on a predetermined sampling variable, such as selecting one of every specified number of segments 163s. For example, signature embedding module 150 may execute signal processing module 154 to select a subset of the discrete sequential segments 163s of media signal 163 comprising every second, third, fourth, fifth, tenth, or one-hundredth discrete segments 163s. However, any different or alternative sampling variable may be used.

In another example, signature embedding module 150 may execute signal processing module 154 to select a subset of the discrete sequential segments 163s of media signal 163 based on a predetermined time-based sampling variable, such as selecting one or more sequential segments 163s every specified period of time. For example, signature embedding module 150 may execute signal processing module 154 to select a subset of the discrete sequential segments 163s of media signal 163 comprising one or more segments 163s selected every 1,000 ms, 2,000 ms, 3,000 ms, 4,000 ms, 5,000 ms, 10,000 ms, or 100,000 ms. However, any different or alternative time-based sampling variable may be used.

In another example, signature embedding module 150 may execute signal processing module 154 to select a subset of the discrete sequential segments 163s of media signal 163 comprising, e.g., the first specified number of sequential discrete segments 163s in media signal 163, or the last specified number of sequential discrete segments in media signal 163.

However, any other suitable selection scheme may be implemented to select a subset of the discrete sequential segments 163s of media signal 163, as segmented in step 204.

Figure 2B:
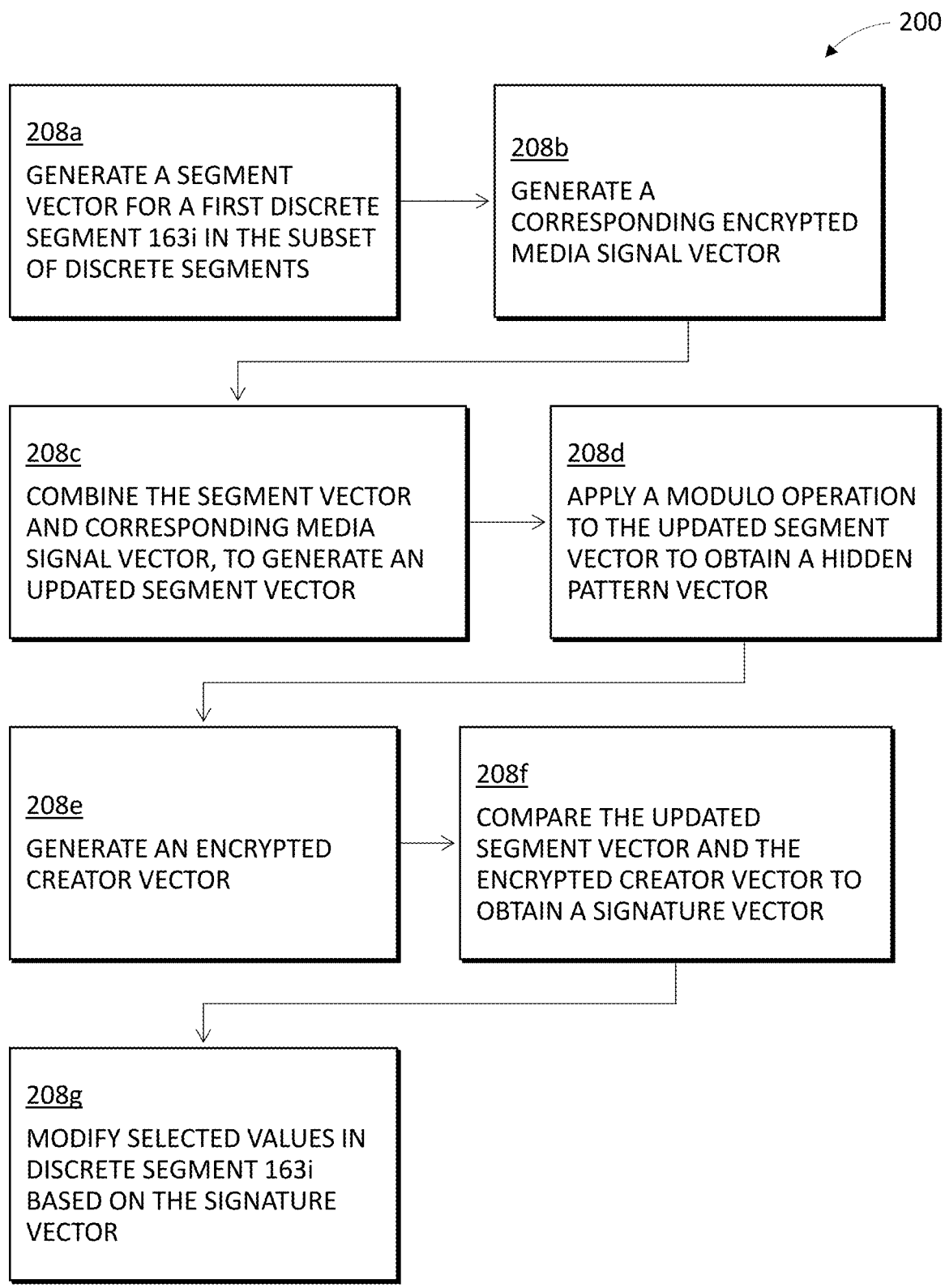
Figure 3:
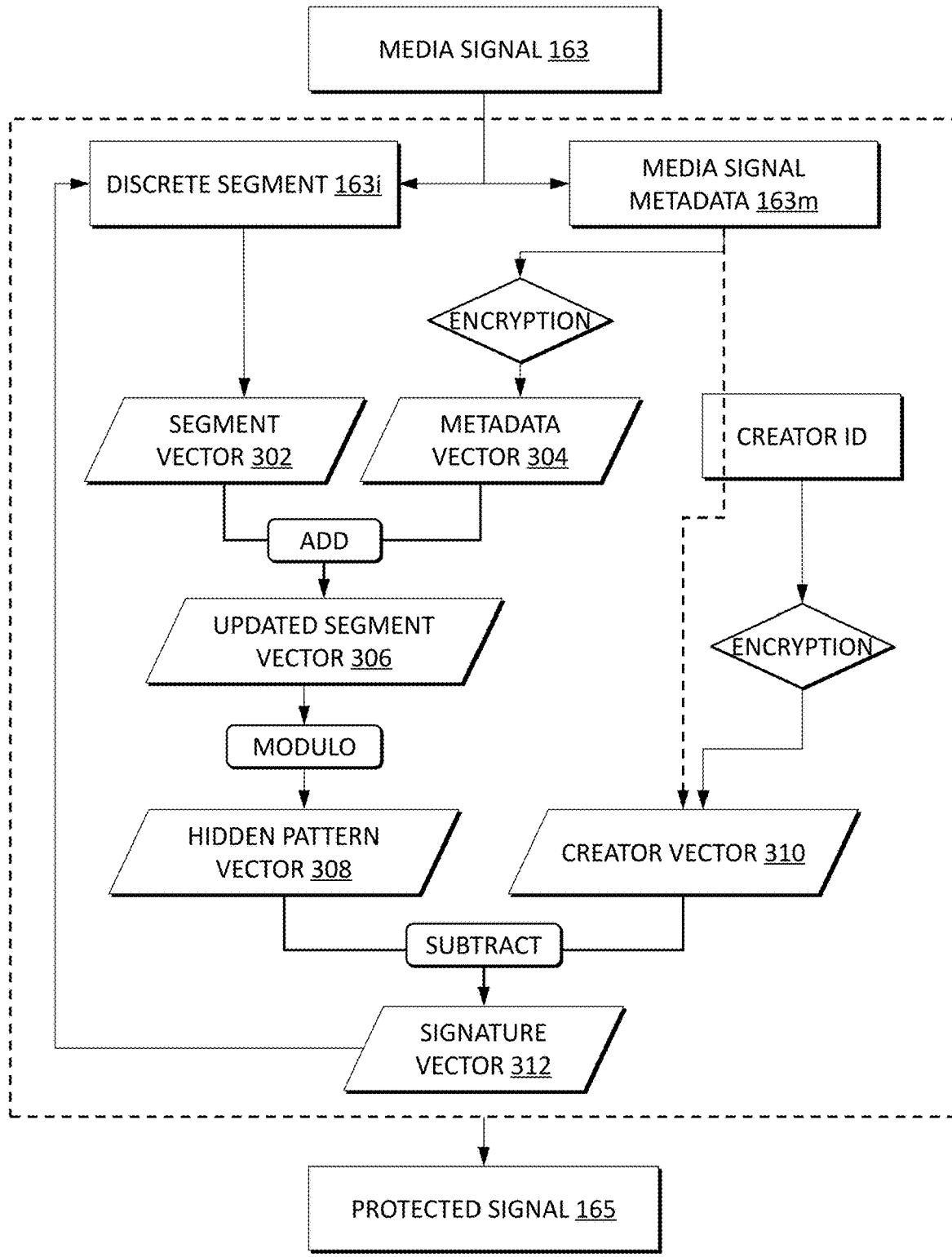
FIG. 3 is a block diagram which illustrates the various steps in a method which provides a protocol for embedding an imperceptible authentication signature in digital media signals.

With reference to FIG. 2B, In step 208, signature embedding module 150 may execute encoder/decoder 156 to begin an iterative process comprising applying sub-steps 208a-208g to each respective discrete segment 163i in the subset of discrete sequential segments 163s of media signal 163, as selected in step 206.

In the case of a media signal 163 comprising image data, segment 163i represents a single image or frame, similar to exemplary frame 300.

In the case of a media signal 163 comprising video data, the subset of discrete segments 163s comprises a plurality of video frames, such as exemplary frame 300 shown in FIG. 4A.

In the case of a media signal 163 comprising audio data, the subset of discrete segments 163s comprises a plurality of time windows, represented as tensors, such as exemplary tensor 400 shown in FIG. 4B.

With continued reference to FIG. 2B, in sub-step 208a, signature embedding module 150 may execute encoder/decoder 156 to generate a segment vector 302 for discrete segment 163i.

As noted above, in the case of an image or a video signal (or multimedia signal comprising video), discrete segment 163i represents a frame, i.e., a rectangular raster of pixels, such as exemplary frame 300. In such cases, signature embedding module 150 may execute encoder/decoder 156 to generate a frame-based segment vector 302, wherein each vector term sums the values of a corresponding column in the frame comprising discrete segment 163i.

In some embodiments, segment vector 302 may be calculated wherein each vector term sums the values of a respective column of only one of the channels in the frame, e.g., the red, green, or blue channels.

In the example shown in FIG. 4A, exemplary frame 300 has a size of 10×10 pixels. Thus, segment vector 302 comprises 10 terms, each a sum of a corresponding column of frame 300. Accordingly, exemplary segment vector 302 comprises the following exemplary terms: [148, 148, 142, 146, 137, 159, 144, 149, 145, 151].

In the case of a media signal 163 comprising digital audio, discrete segment 163*i* represents a time window. Accordingly, signature embedding module 150 may execute encoder/decoder 156 to generate segment vectors 302 wherein each term represents values of a single time window.

As an example, with respect to digital audio having a sampling rate of 48 kHz, a particular time window 163*i* of the subset, having a length of 500 ms, will include 24,000 samples, each comprising a predetermined number of binary bits (e.g., between 4 and 64 bits), depending on the resolution in which an analog sound wave was sampled.

As shown in the example of FIG. 4B, time window 163*i* may be arranged into a tensor comprising 24,000 terms and arranged into dimensions W50×H480, such as exemplary tensor 400. Accordingly, segment vector 302 comprises [50] terms, each representing a sum of a corresponding column of tensor 400.

In sub-step 208*b*, signature embedding module 150 may execute encoder/decoder 156 to generate, an encrypted metadata vector 304 corresponding to segment vectors 302 generated in sub-step 208*a*. In some embodiments, encrypted metadata vector 304 represents metadata 163*m* of media signal 163, as well as properties of the corresponding discrete segment 163*i* and the uploaded media signal 163, including, but not limited to:

Media signal 163 name.
Media signal 163 upload date.
Identification number of discrete segment 163*i*.

In one example, the media signal 163 name is given as "UNTITLED," the upload date is given as "01012001," and the identification number of discrete segment 163*i* is given as "0000000001." Thus, signature embedding module 150 may execute encoder/decoder 156 to use the given media signal 163 name and upload date to generate the vector "UNTITLED_01012001_0000000001." The generated vector may be encrypted using the media authentication service 160 encryption key, to provide the following exemplary encrypted metadata vector 304 expressed in integers:

[122, 91, 250, 86, 16, 1, 229, 249, 217, 77, 188, 144, 254, 255, 224, 147, 92, 161, 218, 170, 61, 215, 108, 75, 149, 0, 107, 73, 146, 29, 106, 208, 225, 233, 30, 89, 55, 12, 203, 96, 246, 223, 83, 243, 188, 94, 153, 196, 149, 122, 114, 205, 76, 241, 36, 231, 191, 164, 251, 99, 154, 156, 173, 204,223, 103, 184, 70, 105, 252, 168, 108, 247, 151, 68, 55, 164, 12, 81, 15, 168, 91, 47, 108, 173, 141,222, 192, 24, 106, 237, 214, 183, 170, 145, 81, 12, 165, 119, 77, 229, 66, 11, 240, 217, 144, 151, 170, 199, 3, 58, 153, 89, 166, 94, 153, 114, 129, 212, 126, 231, 122, 250, 8, 47, 21, 6, 76, 3, 200, 254, 115, 97, 131, 219, 235, 81, 115, 96, 41, 232, 128, 246, 169, 219, 222, 117, 44, 100, 237, 136, 233, 216, 105, 40, 23, 3, 22, 161, 210, 91, 182, 242, 150, 250, 83, 192, 236, 158, 212, 38, 66, 228, 201, 214, 252, 24, 234, 57, 77, 75, 113, 241, 85, 142, 211, 160, 34, 80, 198, 116, 189, 29, 41, 55, 229, 255, 226, 2, 71, 170, 42, 230, 36, 72, 91, 243, 70, 83, 101, 3, 178, 148, 243, 4, 216, 76, 7, 116, 124, 179, 253, 45, 237, 233, 62, 248, 9, 193, 212, 34, 164, 208, 85, 209, 191, 69, 142, 28, 55, 78, 128, 78, 69, 198, 3, 51, 138, 90, 142, 195, 42, 97, 129, 185, 4].

In this example, the encryption method used is SHA-256 (one of the Secure Hash Algorithm 2 family, comprising hash values that are 256 bits). Therefore, the generated encrypted metadata vector 304 has a length of 256. However, any suitable encryption method or algorithm may be used.

In some embodiments, encrypted metadata vector 304 has a length that is at least equal to the length of segment vector 302. When the resulting encrypted metadata vector 304 has a length that is shorter than the length of segment vector 302, encrypted metadata vector 304 may be padded using any suitable method to reach a length that is at least equal to the length of segment vector 302.

In sub-step 208*c*, signature embedding module 150 may execute encoder/decoder 156 to combine segment vectors 302 with the corresponding encrypted metadata vector 304, to generate a combined updated segment vector 306.

In some cases, where encrypted metadata vector 304 has a length that is longer than the length of segment vector 302, signature embedding module 150 may execute encoder/decoder 156 to select the a first portion of encrypted metadata vector 304 which is equal in length to the corresponding segment vector 302.

As can be seen in the example of FIG. 4C (using the exemplary numerical values associated with FIG. 4A), signature embedding module 150 may execute encoder/decoder 156 to combine the exemplary segment vector 302 having a length of 10 [148, 148, 142, 146, 137, 159, 144, 149, 145, 151], and the corresponding first 10 terms of exemplary encrypted metadata vector 304 [122, 91, 250, 86, 16, 1, 229, 249, 217, 77], to output updated segment vector 306 having the terms: [270, 239, 392, 232, 153, 160, 373, 398, 362, 228].

In sub-step 208*d*, signature embedding module 150 may execute encoder/decoder 156 to apply a modulo operation to the updated segment vector 306, to obtain a hidden pattern vector 308. In one example, in the case of frame-based segments, the modulo operation may be based on the height H of the frame comprising discrete segment 163*i* (e.g., H=10 in the case of exemplary frame 300). In the case of time-window segments of digital audio, the modulo operation may be based on the height H of the tensor comprising discrete segment 163*i* (e.g., H=50 in the case of exemplary tensor 400).

Thus, using the example of FIGS. 4A and 4C, signature embedding module 150 may execute encoder/decoder 156 to apply a modulo 10 operation to the updated segment vector 306, having the terms: [270, 239, 392, 232, 153, 160, 373, 398, 362, 228], to obtain a hidden pattern vector 308 of terms [0, 9, 2, 2, 3, 0, 3, 8, 2, 8]. In the example of FIGS. 4A and 4C, the modulo operation results in hidden pattern vector 308 having 10 terms each equal to between 0 and 10 (wherein 10 is the value used in the modulo operation, which represents the height H of exemplary frame 300).

In sub-step 208*e*, signature embedding module 150 may execute encoder/decoder 156 to generate an encrypted creator vector 310, based on the unique creator identifier and user encryption key assigned to creator 162 during registration with media authentication service 160.

Accordingly, in some embodiments, signature embedding module 150 may execute encoder/decoder 156 to generate an encrypted creator vector 310 which represents the unique creator identifier of creator 162. In some embodiments, signature embedding module 150 may execute encoder/ decoder 156 to encrypt creator vector 310 using the user encryption key assigned to creator 162 during registration with media authentication service 160.

In sub-step 208f, signature embedding module 150 may execute encoder/decoder 156 to subtract compare hidden pattern vector 308 generated in sub-step 208d with encrypted creator vector generated in sub-step 208e, to obtain a final signature vector 312, wherein each term X in signature vector 312 has a value such that is equal to $-L \leq X \leq L$.

In the example of FIG. 4C, signature vector 312 has the following terms: [+7, 0, +2, 0, +4, 0, +5, 0, +1, −7], wherein each value X is equal to $-L \leq X \leq L$. Thus, in the example of FIG. 4C, X is equal to $-10 \leq X \leq 10$.

In sub-step 208g, signature embedding module 150 may execute encoder/decoder 156 to modify discrete segment 163i, based on the signature vector 312 generated in sub-step 208f.

In some embodiments, signature embedding module 150 may execute encoder/decoder 156 to modify discrete segment 163i, by first selecting a subset of values in discrete segment 163i for modification.

In the case of image data or video data, using the example of FIG. 4A, signature embedding module 150 may execute encoder/decoder 156 to select a subset of pixels from each column of frame 300 for modification. The number of pixels selected from each column is equal to the absolute value of the term of signature vector 312 corresponding to each column without regard to its sign (i.e., whether positive or negative). For example, column 0 in exemplary frame 300 corresponds to the first term+7 in signature vector 312, column 1 corresponds to the second term 0, and column 9 corresponds to the last term −7. Accordingly, in the example of FIG. 4C, signature embedding module 150 may execute encoder/decoder 156 to select a subset of 7 pixels from column 0, zero pixels from column 2, and 7 pixels from column 9 in frame 300.

In the case of an audio media signal, using the example of FIG. 4B, signature embedding module 150 may execute encoder/decoder 156 to select a subset of elements from each column of tensor 400 for modification. The number of tensor elements selected from each column is again equal to the value of the term in signature vector 312 corresponding to each column. For example, column 0 in exemplary tensor 400 corresponds to the first term in signature vector 312, and so on.

The subset of pixels or tensor elements, as the case may be, in each column may be selected based on any suitable selection scheme, such as:
  Random selection.
  Selecting every second, third, fourth, fifth, tenth, etc. element in each column.
  Selecting elements which represent a noise value exceeding a predetermined threshold (such as based on a standard deviation calculation with respect to the entire frame/tensor).
  Applying a trained machine learning model to select elements based on one or more predicted properties, such as elements predicted to be the least significant in the discrete segment, or whose modification is predicted to have the least amount of effect with respect to the discrete segment.
  Minimum visibility criteria, which selects elements least likely to have a segment-wide effect, based on local cross-analysis.

Upon selecting of the subset of pixels/tensor terms, signature embedding module 150 may execute encoder/decoder 156 to modify a value of each selected element, based on the sign of the corresponding term in signature vector 312. Thus, using the example of FIG. 4A, the first term in signature vector 312 is +7, and thus a subset of 7 selected pixels in column 0 will each be modified by increasing their value by 1. The second term in signature vector 312 is 0, and thus no pixels will be modified in the second column. The last term in signature vector 312 is −7, and thus 7 pixels each will be modified in column 9 by decreasing their value by 1. A similar process will be applied to audio tensors, wherein a value of a tensor terms may be increased or decreased by 1.

In some embodiments, sub-step 208g comprises dividing each frame or tensor, as the case may be, into two portions. The first portion is modified using the signature vector 312 generated in sub-step 208f, as described immediately above. The second portion is modified in the same manner, however, based on a version of hidden pattern vector 308 generated in sub-step 208d, which is encrypted using a media authentication service 160 encryption key. The encrypted version of hidden pattern vector 308 is compared with encrypted creator vector generated in sub-step 208e, to obtain a modified final signature vector 312a. Modified final signature vector 312a is then used to modify the second portion of the frame/tensor, as described immediately above.

Sub-steps 208a-208g may then be repeated with respect to a next discrete segment 163i in the subset selected in step 206.

With reference back to FIG. 2A, method 200 then turns to step 210, wherein signature embedding module 150 outputs a protected version 165 of media signal 163, which comprises an embedded imperceptible authentication signature.

In step 212, any third-party in receipt of protected version 165 of media signal 163 may wish to verify the authenticity and integrity of protected media 165. Thus, the receiving third-party may then access media authentication service 160 to decode the embedded signature in protected media 165, and to verify the authenticity of protected media 165. This decoding and verification process may be performed by media authentication service 160 upon request from a platform 166 or end-used 168 (as shown in FIG. 1B) at any point or in real-time or near real-time, e.g., right ahead of, or during, playback by the receiving third-party of protected media 165.

Accordingly, in some embodiments, signature embedding module 150 may executed encoder/decoder 156 to analyze protected media 165 by:
  Analyzing each discrete segment of protected media 165 to extract the encrypted creator vector 310 used to modify each discrete segment, based on sum of values per each column in the discrete segment.
  Reversing the encrypting process using the media authentication service 160 encryption key.
  Extracting the unique creator identifier of user 162.
  Verifying that the unique creator identifier of user 162 is identical for all discrete segments in protected media 165.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range—10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:
   receiving, from a creator, a digital media signal and associated metadata comprising at least a media signal name, wherein said media signal is associated with a unique creator identifier;
   segmenting said media signal into sequential discrete segments, each represented as a rectangular tensor comprising columns and rows of values and having a width W and a height H, wherein each of said discrete segments is assigned a segment identification number;
   selecting a subset of said sequential discrete segments;
   iteratively, for each respective one of said discrete segments in said subset:
   (i) generating a segment vector, wherein each term in said segment vector represents a sum of said values in a corresponding one of said columns in said respective discrete segment,
   (ii) generating a metadata vector based on said associated metadata and said segment identification number of said respective discrete segment, wherein said metadata vector is encrypted using a first encryption key,
   (iii) combining said segment vector and a portion of said metadata vector having a length equal to W, to generate an updated segment vector,
   (iv) applying a modulo operation, based on a numerical value equal to H, to each term in said updated segment vector, to obtain a hidden pattern vector,
   (v) generating a creator vector based on said unique creator identifier, wherein said creator vector is encrypted using a second encryption key associated with said creator,
   (vi) subtracting said hidden pattern vector from said creator vector to obtain a signature vector,
   (vii) modifying a selected subset of said values in each of said columns in said respective discrete segment, based on a corresponding term in said signature vector, to obtain a modified said respective discrete segment, and
   (viii) repeating steps (i)-(vii) with respect to a next respective one of said discrete segments in said subset said discrete; and outputting a modified version of said media signal comprising all of said modified discrete segments,
   wherein said media signal is a digital video signal, and wherein each of said discrete segments comprises one frame of said digital video signal.

2. The computer-implemented method of claim 1, wherein said digital video signal is associated with a color space having a specified number of color channels, and wherein each of said discrete segments comprises said one frame in only one of said color channels.

3. The computer-implemented method of claim 1, wherein said metadata further comprises a date associated with said receiving, and wherein said metadata vector is further based on said date.

4. The computer-implemented method of claim 1, wherein said selecting of said subset is based on one of the following methods: selecting all of said discrete segments, selecting one of every specified number of said discrete segments, selecting one or more of said discrete segments every specified period of time, or selecting a specified number of sequential said discrete segments.

5. The computer-implemented method of claim 1, wherein a number of said values in said selected subset of said values is equal to the absolute value of said corresponding term in said signature vector, and wherein said subset of values is selected based on one of the following methods: random selection, selecting one of every specified number of said values, selecting said values exceeding a predetermined value threshold, or selecting said values representing the least significant said values in said respective discrete segment.

6. The computer-implemented method of claim 1, wherein said modifying of said selected subset of said values comprises increasing each of said values in said subset of values by 1 when said corresponding term in said signature vector is positive, decreasing each of said values in said subset of values by/when said corresponding term in said signature vector is negative, and not modifying said selected subset of said values when said corresponding term in said signature vector is equal to zero.

7. A computer program product comprising a non-transitory computer-readable storage medium having program instructions embodied therewith, the program instructions executable by a computer system to:
 receive, from a creator, a digital media signal and associated metadata comprising at least a media signal name, wherein said media signal is associated with a unique creator identifier;
 segment said media signal into sequential discrete segments, each represented as a rectangular tensor comprising columns and rows of values and having a width W and a height H, wherein each of said discrete segments is assigned a segment identification number;
 select a subset of said sequential discrete segments;
 iteratively, for each respective one of said discrete segments in said subset:
 (i) generate a segment vector, wherein each term in said segment vector represents a sum of said values in a corresponding one of said columns in said respective discrete segment,
 (ii) generate a metadata vector based on said associated metadata and said segment identification number of said respective discrete segment, wherein said metadata vector is encrypted using a first encryption key,
 (iii) combine said segment vector and a portion of said metadata vector having a length equal to W, to generate an updated segment vector,
 (iv) apply a modulo operation, based on a numerical value equal to H, to each term in said updated segment vector, to obtain a hidden pattern vector,
 (v) generate a creator vector based on said unique creator identifier, wherein said creator vector is encrypted using a second encryption key associated with said creator,
 (vi) subtract said hidden pattern vector from said creator vector to obtain a signature vector,
 (vii) modify a selected subset of said values in each of said columns in said respective discrete segment, based on a corresponding term in said signature vector, to obtain a modified said respective discrete segment, and
 (viii) repeat steps (i)-(vii) with respect to a next respective one of said discrete segments in said subset said discrete; and
 output a modified version of said media signal comprising all of said modified discrete segments,
 wherein said media signal is a digital video signal, and wherein each of said discrete segments comprises one frame of said digital video signal.

8. The computer program product of claim 7, wherein said digital video signal is associated with a color space having a specified number of color channels, and wherein each of said discrete segments comprises said one frame in only one of said color channels.

9. The computer program product of claim 7, wherein said metadata further comprises a date associated with said receiving, and wherein said metadata vector is further based on said date.

10. The computer program product of claim 7, wherein said selecting of said subset is based on one of the following methods: selecting all of said discrete segments, selecting one of every specified number of said discrete segments, selecting one or more of said discrete segments every specified period of time, or selecting a specified number of sequential said discrete segments.

11. The computer program product of claim 7, wherein a number of said values in said selected subset of said values is equal to the absolute value of said corresponding term in said signature vector, and wherein said subset of values is selected based on one of the following methods: random selection, selecting one of every specified number of said values, selecting said values exceeding a predetermined value threshold, or selecting said values representing the least significant said values in said respective discrete segment.

12. The computer program product of claim 7, wherein said modifying of said selected subset of said values comprises increasing each of said values in said subset of values by 1 when said corresponding term in said signature vector is positive, decreasing each of said values in said subset of values by/when said corresponding term in said signature vector is negative, and not modifying said selected subset of said values when said corresponding term in said signature vector is equal to zero.

13. A system comprising:
 at least one processor; and
 a non-transitory computer-readable storage medium having stored thereon program
 instructions, the program instructions executable by the at least one processor to:
 receive, from a creator, a digital media signal and associated metadata comprising at least a media signal name, wherein said media signal is associated with a unique creator identifier,
 segment said media signal into sequential discrete segments, each represented as a rectangular tensor comprising columns and rows of values and having a width W and a height H, wherein each of said discrete segments is assigned a segment identification number,
 select a subset of said sequential discrete segments, iteratively, for each respective one of said discrete segments in said subset:

(i) generate a segment vector, wherein each term in said segment vector represents a sum of said values in a corresponding one of said columns in said respective discrete segment, (ii) generate a metadata vector based on said associated metadata and said segment identification number of said respective discrete segment, wherein said metadata vector is encrypted using a first encryption key, (iii) combine said segment vector and a portion of said metadata vector having a length equal to W, to generate an updated segment vector, (iv) apply a modulo operation, based on a numerical value equal to H, to each term in said updated segment vector, to obtain a hidden pattern vector, (v) generate a creator vector based on said unique creator identifier, wherein said creator vector is encrypted using a second encryption key associated with said creator, (vi) subtract said hidden pattern vector from said creator vector to obtain a signature vector, (vii) modify a selected subset of said values in each of said columns in said respective discrete segment, based on a corresponding term in said signature vector, to obtain a modified said respective discrete segment, and (viii) repeat steps (i)-(vii) with respect to a next respective one of said discrete segments in said subset said discrete, and output a modified version of said media signal comprising all of said modified discrete segments, wherein said media signal is a digital video signal, and wherein each of said discrete segments comprises one frame of said digital video signal.

14. The system of claim 13, wherein a number of said values in said selected subset of said values is equal to the absolute value of said corresponding term in said signature vector, and wherein said modifying of said selected subset of said values comprises increasing each of said values in said subset of values by/when said corresponding term in said signature vector is positive, decreasing each of said values in said subset of values by 1 when said corresponding term in said signature vector is negative, and not modifying said selected subset of said values when said corresponding term in said signature vector is equal to zero.

\* \* \* \* \*